(12) United States Patent
Cheng et al.

(10) Patent No.: US 9,475,917 B2
(45) Date of Patent: Oct. 25, 2016

(54) RUBBER COMPOSITION AND MANUFACTURING METHOD FOR THE SAME

(71) Applicant: Chi Mei Corporation, Tainan (TW)

(72) Inventors: Kuei-Lun Cheng, Tainan (TW); Kuan-Lin Hsieh, Tainan (TW); Chih-Cheng Lee, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 281 days.

(21) Appl. No.: 14/139,899

(22) Filed: Dec. 24, 2013

(65) Prior Publication Data

US 2014/0187696 A1 Jul. 3, 2014

(30) Foreign Application Priority Data

Dec. 28, 2012 (TW) .............................. 101151127 A

(51) Int. Cl.
*C08K 5/134* (2006.01)
(52) U.S. Cl.
CPC ..................... *C08K 5/134* (2013.01)
(58) Field of Classification Search
CPC ...................................................... C08K 5/134
USPC ........................................................ 524/291
See application file for complete search history.

(56) References Cited

U.S. PATENT DOCUMENTS

| | | | |
|---|---|---|---|
| 5,045,581 A | 9/1991 | Takata et al. | |
| 5,128,398 A | 7/1992 | Sasaki et al. | |
| 5,227,419 A | 7/1993 | Moczygemba et al. | |
| 5,290,875 A | 3/1994 | Moczygemba et al. | |
| 6,252,008 B1 | 6/2001 | Scholl et al. | |
| 8,053,512 B2 | 11/2011 | Thiele et al. | |
| 2010/0069568 A1* | 3/2010 | Thiele | B60C 1/0016 524/571 |
| 2013/0085228 A1 | 4/2013 | Tanaka et al. | |
| 2013/0172492 A1 | 7/2013 | Cheng et al. | |

FOREIGN PATENT DOCUMENTS

| | | |
|---|---|---|
| CN | 101610917 A | 12/2009 |
| EP | 0322166 A1 | 6/1989 |
| JP | 3619286 | 10/1961 |
| TW | 224976 | 6/1994 |
| TW | 513463 | 12/2002 |
| TW | I296003 | 4/2008 |
| TW | 201213343 A1 | 4/2012 |
| TW | 201326227 | 7/2013 |
| TW | 201326238 | 7/2013 |

OTHER PUBLICATIONS

TW Office Action dated Apr. 30, 2014.
English Abstract translation of TWI296003 (Published Apr. 21, 2008).
English Abstract translation of TW201326227 (Published Jul. 1, 2013).
English Abstract translation of TW224976 (Published Jun. 11, 1994).
English Abstract translation of TW513463 (Published Dec. 11, 2002).
English Abstract translation of JP3619286 (Published Oct. 13, 1961).
CN Office Action dated May 11, 2015 in corresponding Chinese application (No. 201310218376.5).

* cited by examiner

*Primary Examiner* — Angela C Scott
(74) *Attorney, Agent, or Firm* — McClure, Qualey & Rodack, LLP

(57) ABSTRACT

A rubber composition and a method for manufacturing the same are provided. The rubber composition includes a main chain modified conjugated diene based polymer and a stabilizer. A weight ratio of the main chain modified conjugated diene based polymer to the stabilizer is 100:0.2~2. The stabilizer has a structural formula of:

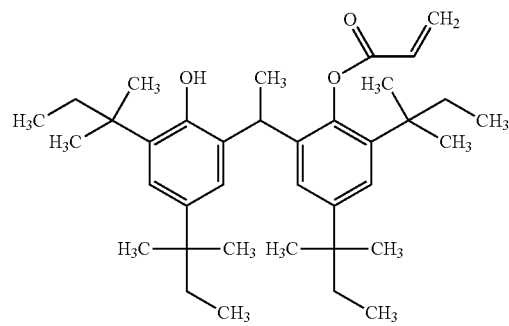

10 Claims, No Drawings

RUBBER COMPOSITION AND MANUFACTURING METHOD FOR THE SAME

This application claims the benefit of Taiwan application Serial No. 101151127, filed Dec. 28, 2012, the subject matter of which is incorporated herein by reference.

BACKGROUND

1. Technical Field

The invention relates to a polymer and more specifically to a modified conjugated diene based polymer.

2. Description of the Related Art

Conjugated diene polymer is widely used for resin modifying applications and various industrial goods. One of use is for manufacturing tires. Demand for low fuel consumption and attrition for the tires has increased with increasing environmental consciousness. To conform to the current demand trend, the rolling resistance property, the wet traction property, the tensile strength property, etc. of mechanical characteristics of the conjugated diene polymer must be increased.

Currently, carbon black is added to the conjugated diene polymer to increase the strength of the tires. In recent years, due to the depletion of oil resource and the global warming issue, the industries have many methods by using silica as a reinforcing filler. In comparison with carbon black, silica is more difficult to be uniformly distributed in conjugated diene polymer. Therefore, the compatibility between silica and conjugated diene polymer needs to be further increased.

According to one improvement method, when adding silica to the conjugated diene polymer during the manufacturing process of tires, a modifier of small molecule is used to perform blending. However, since the blending uniformity largely affects the properties of the products, product quality may differ from batch to batch, and quality reproducibility is poor. Moreover, it is hard to make sure if the conjugated diene polymer is modified by the modifier, or the modifier only reacts with silica.

In addition, compatibility between silica and a main chain modified conjugated diene based polymer can be increased by a main-chain modifying method. However, characteristic of the main chain modified conjugated diene based polymer is not stable during a long duration due to its saturated double bond on a molecular chain of which.

A prior reference EP0322166 discloses adding an antioxidant into a conjugated diene based polymer. It can improve slightly only discoloration or thermal decomposition problem occurring in a high temperature process of a blending step, etc. However, it can not solve the problem of the unstable characteristic of the main chain modified conjugated diene based polymer during a long duration. 2,4-t-amyl-6-[1-(3,5-di-t-amyl-2-hydroxyphenyl)-ethyl]-phenyl acrylate can be added into a raw glue of a rubber after stopping a polymerization reaction for the rubber or during a blending step to solve the discoloration or thermal decomposition problem that would occur in a subsequent high temperature process such as a blending step, etc. following the polymerization reaction.

SUMMARY

The present disclosure relates to a rubber composition and a manufacturing method for the same are provided. The rubber composition comprises a main chain modified conjugated diene based polymer having a stable characteristic for long duration.

The rubber composition comprises a main chain modified conjugated diene based polymer and a stabilizer. A weight ratio of the main chain modified conjugated diene based polymer to the stabilizer is 100:0.2~2. The stabilizer has a structural formula of:

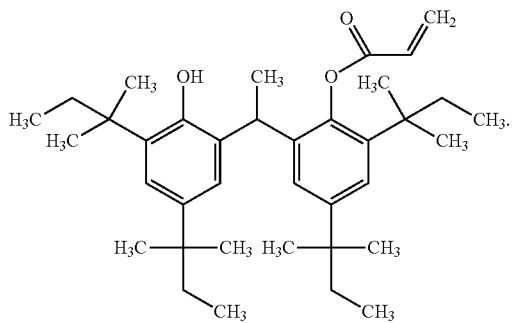 [SMILES: C=CC(=O)Oc1c(C(C)c2cc(C(C)(C)CC)cc(C(C)(C)CC)c2O)cc(C(C)(C)CC)cc1C(C)(C)CC]

In one embodiment, a conjugated diene based polymer of the main chain modified conjugated diene based polymer is selected from the group consisting of a conjugated diene-vinyl aromatic hydrocarbon copolymer rubber (such as styrene-butadiene rubber, SBR), a styrenic block copolymer (such as styrene-butadiene block copolymer, SBC), a conjugated diene-vinyl aromatic hydrocarbon block copolymer (such as styrene-butadiene-styrene block copolymer, SBS), a polybutadiene rubber having less than 40 mole % of a cis-structure (such as low cis-polybutadiene rubber, LBR), and a polybutadiene rubber having more than 90 mole % of a cis-structure (such as high cis-polybutadiene rubber, HBR).

The method for manufacturing a rubber composition comprises following steps. 100 parts by weight of a main chain modified conjugated diene based polymer is mixed with 0.2~2 parts by weight of a stabilizer. The stabilizer has a structural formula:

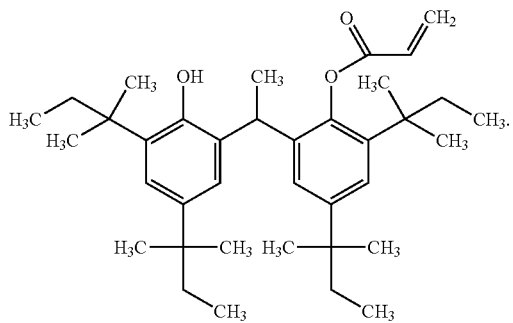 [SMILES: C=CC(=O)Oc1c(C(C)c2cc(C(C)(C)CC)cc(C(C)(C)CC)c2O)cc(C(C)(C)CC)cc1C(C)(C)CC]

In one embodiment, a modified quantity of the main chain modified conjugated diene based polymer is 0.1~5 mol % of a 1,2-vinyl structure of the main chain modified conjugated diene based polymer.

In one embodiment, the main chain modified conjugated diene based polymer comprises a main chain modified conjugated diene-vinyl aromatic hydrocarbon copolymer formed by a method comprising following steps. An unmodified conjugated diene-vinyl aromatic hydrocarbon copolymer is formed by making a conjugated diene monomer react with a vinyl aromatic hydrocarbon monomer in a solution. Then, the un-modified conjugated diene-vinyl aromatic hydrocarbon copolymer is modified by a modifier to form the main chain modified conjugated diene-vinyl aromatic hydrocarbon copolymer.

Wherein a weight of the conjugated diene monomer: a weight of the vinyl aromatic hydrocarbon monomer is 2~5:1.

Wherein a weight ratio of a total amount of the conjugated diene monomer and the vinyl aromatic hydrocarbon monomer to a quantity of the stabilizer is 100:0.2~2.

Wherein the modifier comprises a mercapto group containing modifier.

Wherein the modifier comprise a mercapto group containing alcohol compound, a mercapto group containing acid compound, or a mercapto group containing ester compound.

Wherein a mole ratio of the stabilizer to the modifier is 0.1~10.

BRIEF DESCRIPTION OF THE DRAWINGS

None

DETAILED DESCRIPTION

In embodiments, a rubber composition and a manufacturing method for the same are provided. The rubber composition comprises a main chain modified conjugated diene based polymer having a stable characteristic for long duration.

In one embodiment, a conjugated diene based polymer of the main chain modified conjugated diene based polymer is selected from the group consisting of a conjugated diene-vinyl aromatic hydrocarbon copolymer rubber (such as styrene-butadiene rubber, SBR), a styrenic block copolymer (such as styrene-butadiene block copolymer, SBC), a conjugated diene-vinyl aromatic hydrocarbon block copolymer (such as styrene-butadiene-styrene block copolymer, SBS), a polybutadiene rubber having less than 40 mole % of a cis-structure (such as low cis-polybutadiene rubber, LBR), and a polybutadiene rubber having more than 90 mole % of a cis-structure (such as high cis-polybutadiene rubber, HBR).

In one embodiment, the conjugated diene based polymer of the main chain modified conjugated diene based polymer is the conjugated diene-vinyl aromatic hydrocarbon copolymer rubber such as SBR, which is synthesized by a method comprising reacting a conjugated diene monomer with a vinyl aromatic hydrocarbon monomer in a solution to form a un-modified conjugated diene-vinyl aromatic hydrocarbon copolymer, and then modifying the un-modified conjugated diene-vinyl aromatic hydrocarbon copolymer by a modifier to form the main chain modified conjugated diene-vinyl aromatic hydrocarbon copolymer. Then, the main chain modified conjugated diene-vinyl aromatic hydrocarbon copolymer is mixed with a stabilizer to form the rubber composition.

In one embodiment, the stabilizer is 2,4-t-amyl-6-[1-(3, 5-di-t-amyl-2-hydroxyphenyl)-ethyl]-phenyl acrylate, having a structural formula of:

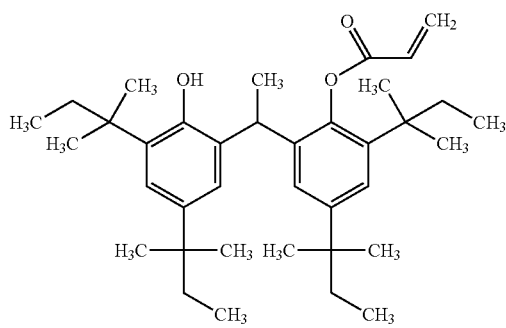 [SMILES: C=CC(=O)Oc1c(C(C)c2cc(C(C)(C)CC)cc(C(C)(C)CC)c2O)cc(C(C)(C)CC)cc1C(C)(C)CC]

stabilizer

In one embodiment, a weight ratio of the conjugated diene monomer to the vinyl aromatic hydrocarbon monomer is 2~5:1.

The conjugated diene monomer may comprise 1,3-butadiene, 1,3-pentadiene, isoprene, 1,3-hexadiene, 2,4-hexadiene, 2,3-dimethyl-1,3-butadiene, 2-ethyl-1,3-butadiene, 1,3-pentadiene, etc. In addition, a branched conjugated diene compound having a carbon number of 4~7 may be used. Among the compounds, 1,3-butadiene, isoprene, and 1,3-pentadiene are preferable, and 1,3-butadiene is more preferable.

The vinyl aromatic hydrocarbon monomer may comprise styrene, α-methyl styrene, p-methyl styrene, vinyl toluene, vinyl naphthalene, vinyl ethyl benzene, vinyl xylene, etc, wherein the styrene, the α-methyl styrene, or the p-methyl styrene are preferable, and the styrene is more preferable.

In one embodiment, the un-modified conjugated diene-vinyl aromatic hydrocarbon copolymer is formed by copolymerizing the conjugated diene monomer and the vinyl aromatic hydrocarbon monomer. The copolymer comprises a conjugated diene monomer unit and a vinyl aromatic hydrocarbon monomer unit. That is, the conjugated diene monomer unit and the vinyl aromatic hydrocarbon monomer unit respectively refer to the structural units of the conjugated diene monomer and the vinyl aromatic hydrocarbon monomer in the un-modified conjugated diene-vinyl aromatic hydrocarbon copolymer alter the conjugated diene monomer and the vinyl aromatic hydrocarbon monomer are copolymerized.

The conjugated diene monomer unit may comprise a 1,3-butadiene monomer unit, a 1,3-pentadiene monomer unit, an isoprene monomer unit, 1,3-hexadiene monomer unit, a 2,4-hexadiene monomer unit, a 2,3-dimethyl-1,3-butadiene monomer unit, a 2-ethyl-1,3-butadiene monomer 2.0 unit, etc.

The vinyl aromatic hydrocarbon monomer unit may comprise a styrene monomer unit, a α-methyl styrene monomer unit, a p-methyl styrene monomer unit, a vinyl toluene monomer unit, a vinyl naphthalene monomer unit, a vinyl ethyl benzene monomer unit, a vinyl xylene monomer unit, etc.

The un-modified conjugated diene-vinyl aromatic hydrocarbon copolymer may be formed by the polymerization reaction of the conjugated diene monomer with the vinyl aromatic hydrocarbon monomer in existence of an initiator. In one embodiment, the initiator is an organic alkali metal compound. For example, the initiator may comprise ethyl lithium, n-propyl lithium, isopropyl lithium, n-butyllithium, n-pentyl lithium, phenyl lithium, tolyl lithium or a combination thereof.

The polymerization reaction of the conjugated diene monomer with the vinyl aromatic hydrocarbon monomer may be carried out in existence of a solvent. For example, the solvent may comprise a non-polar solvent comprising a saturated hydrocarbon, an aromatic hydrocarbon, etc., or a combination thereof, such as an aliphatic hydrocarbon (such as pentane, hexane, and heptane), an alicyclic hydrocarbon (such as cyclopentane, cyclohexane, methyl cyclopentane, and methyl cyclohexane), an aromatic hydrocarbon (such as benzene, toluene, and xylene), or a combination thereof. However, the present disclosure is not limited thereto.

The polymerization reaction of the conjugated diene monomer with the vinyl aromatic hydrocarbon monomer may be carried out in existence of a micro-structure modifier which can enable a random copolymerization of the conjugated diene monomer with the vinyl aromatic hydrocarbon monomer. In one embodiment, the micro-structure modifier may be a polar compound functioning as a vinylating agent. The micro-structure modifier may comprise an ether (such as tetrahydrofuran, diethyl ether, dioxane, 1,2-dimethoxyethane, 1,2-dibutoxyethane, diethylene glycol dimethyl ether, diethylene glycol dibutyl ether, dimethoxybenzene, 2,2-ditetrahydrofurylpropane (DTHFP), etc); a tertiary amine (such as tetramethylethylenediamine, dipiperidine ethane, trimethylamine, triethylamine, pyridine, quinuclidine, etc); an alkali metal alkyl alcoholates (such as potassium tert-pentoxide, potassium tert-butoxide, sodium tert-butoxide, sodium tert-pentoxide, etc); a phosphine compound (such as triphenylphosphine, etc); an alkyl or an aryl sulfonic acid compound. These polar compounds can be used individually or as a combination of two or more than two compounds.

A usage amount of the micro-structure modifier is based on target objects and effects. Normally, a mole of the micro-structure modifier is 0.01~100 with respect to 1 mole of the initiator. According to an expected amount of a (1,2) vinyl structure, the polar compound (vinylating agent) can be suitably used as a micro-structure regulator for the diene part of the polymer.

Due to the polymerization reaction of the conjugated diene monomer, a 1,4-structure may be obtained from a 1,4-polymerization, and a 1,2-structure may be obtained from a 1,2-polymerization. The 1,4-structure and the 1,2-structure may co-exist in a molecular chain. The 1,4-structure can be further divided into a cis-structure and a trans-structure. The 1,2-structure is a structure having a vinyl group at a side chain.

For example, the (1,2) vinyl structure substantially amounts to 10%~90% of the conjugated diene monomer unit of the un-modified conjugated diene-vinyl aromatic hydrocarbon copolymer. In some embodiments, the (1,2) vinyl structure substantially amounts to 50%~90%, or 55%~70%, or preferably 60%~65% of the conjugated diene monomer unit of the un-modified conjugated diene-vinyl aromatic hydrocarbon copolymer. The conjugated diene monomer unit substantially amounts to 74 wt. %~84 wt. % of the main chain modified conjugated diene-vinyl aromatic hydrocarbon copolymer. The vinyl aromatic hydrocarbon monomer unit substantially amounts to 16 wt. %~26 wt. % of the main chain modified conjugated diene-vinyl aromatic hydrocarbon copolymer. In other embodiments, if the vinyl (1,2) structure substantially amounts to 20%~40%, preferably 25%~35%, of the conjugated diene monomer unit, the conjugated diene monomer unit substantially amounts to 80 wt. %-90 wt. %, preferably 85 wt. %, of the conjugated diene-vinyl aromatic hydrocarbon copolymer, and the vinyl aromatic hydrocarbon monomer unit substantially amounts to 10 wt. %~20 wt. %, preferably 15 wt. %, of the conjugated diene-vinyl aromatic hydrocarbon copolymer. A method disclosed in Taiwan application Serial No. 100150017 may be used for manufacturing such un-modified conjugated diene-vinyl aromatic hydrocarbon copolymer, un-modified conjugated diene-vinyl aromatic hydrocarbon copolymer In one embodiment, the un-modified conjugated diene based polymer is a block copolymer (a1)) of a vinyl aromatic hydrocarbon monomer and a conjugated diene monomer, which may be a formula of :(A–B)n, (A–B)n–A, or (A–B)nX, wherein n is an integer ≥1. In a known method (for example disclosed in JR patent number Sho36-19286, the (A–B)n block copolymer is prepared by a copolymerization by adding an organolithium compound little by little into a mixture of a vinyl aromatic hydrocarbon monomer and a conjugated diene monomer. The structure of the block copolymer (a1) of the vinyl aromatic hydrocarbon compound and the conjugated diene compound comprises at least one block having the vinyl aromatic hydrocarbon monomer unit as a principal component (i.e. having the vinyl aromatic hydrocarbon monomer unit of ≥50 wt. %); at least one block having the conjugated diene compound as a principal monomer unit (i.e. having the conjugated diene monomer unit of ≥50 wt. %). In the block copolymer (a1) of the vinyl aromatic hydrocarbon monomer and the conjugated diene monomer, the vinyl aromatic hydrocarbon monomer unit amounts to 5~50 wt. %, or 10~45 wt. %, or 15~40 wt. % of the block copolymer (a1). The copolymer of the vinyl aromatic hydrocarbon monomer and the conjugated diene monomer, of this kind used as the un-modified conjugated diene based polymer, such as SBC, may be prepared by the methods disclosed in U.S. Pat. No. 5,290,875 and U.S. Pat. No. 5,227,419.

In one embodiment, the un-modified conjugated diene based polymer is the polybutadiene rubber having the cis-structure of ≥90 mol %, such as HBR, that can be manufactured by the methods disclosed in TW application No. 100150013.

In one embodiment, the un-modified conjugated diene based polymer is the polybutadiene rubber having the cis-structure of ≤40 mol %, such as LBR, that can be manufactured by the methods disclosed in TW patent No. 224976 and 513463.

In one embodiment, the modifier for modifying the un-modified conjugated diene based polymer into the main chain modified conjugated diene based polymer may comprise a mercapto group containing modifier, such as a mercapto group containing alcohol compound, or a mercapto group containing acid compound or ester compound.

In one embodiment, the mercapto group containing alcohol compound comprises, but is not limited to, 2-mercaptoethanol, 3-mercapto-1-propanol, 1-mercapto-2-propanol, 4-mercapto-1-butanol, 1-mercapto-2-butanol, 1-mercapto-3-butanol, 1-mercapto-2-pentanol, 1-mercapto-2-hydroxycyclohexane, 3-mercapto-1,2-propanediol, α-mercapto-ω-hydroxyoligoethylene oxides, such as α-mercapto-ω-hydroxyoctaethylene glycol, or corresponding cyclo ethylene oxide/propylene oxide copolyethers. The mercapto group containing acid compound comprises, but is not limited to, mercaptoacetic acid, 2-mercaptopropionic acid, 3-mercaptopropionic acid, 4-mercaptobutyric acid, mercaptoundecanoic acid, mercaptooctadecanoic acid, 2-mercaptosuccinic acid, or a salt or ammonium salt containing an alkali metal, or alkaline earth metal. The mercapto group containing ester compound comprises, but is not limited to, the foregoing mercapto group containing acid compound and the following alcohol compound formed by an esterification: ethylene glycol, propylene glycol, butylene glycol, diethylene glycol, triethylene glycol, tetraethylene glycol, octaethylene glycol, dipropylene glycol, tripropylene glycol, tetrapropylene glycol or N-methyldiethanolamine. The ester compound formed by the reaction of the mentioned alcohol compound and the mercaptoacetic acid or the 3-mercaptopropionic acid is preferable.

In one embodiment, the modifier uses 2-mercaptoethanol.

The reaction of the un-modified conjugated diene-vinyl aromatic hydrocarbon copolymer and the modifier may be directly subsequently carried out in the solvent used for the polymerization reaction of the conjugated diene monomer and the vinyl aromatic hydrocarbon monomer, with an existence of an accelerator.

The accelerator may comprise t-butyl hydroperoxide, p-menthane hydroperoxide, di-t-butyl peroxide, di-cumyl peroxide, lauoryl perioxide, t-butyl perbenzoate, 1,1'-azobis (cyclohexane-carbonitrile), azobisisobutyronitrile (AIBN), 1,1-Bis(t-butyl peroxy)3,3,5-trimethyl cyclohexane, or a combination thereof.

The accelerator may comprise a peroxy acyl compound, a peroxy ester compound, a peroxy ketal compound, a peroxy carbonate compound, or an azo compound having a nitro group and a heterocyclic group. For example, the peroxy acyl compound comprises dibenzoyl peroxide, lauroyl peroxide, etc. For example, the peroxy ester compound comprises tert-butyl perbenzoate, tert-pentyl perbenzoate, tert-butyl peracetate, tert-pentyl peracetate, tert-butyl (3,3, 5-trimethyl peroxy hexanoate), ditert-butyl peroxy hexahydro-terephthalate, ditert-butyl peroxy azelate, tert-butyl peroxy isobutyrate, 2,5-dimethyl-2,5-bis-(benzoyl peroxy) hexane, or di-neopentyl-peroxy azelate, etc. For example, the peroxy ketal compound comprises 1,1-di(tert-butyl peroxy)cyclohexane, 1,1-bis-tert-butyl peroxy-3,5,5-trimethyl cyclohexane, 1,1-bis-tert-pentyl peroxy cyclohexane, 1,1-bis-tert-pentyl peroxy-3,3,5-dimethyl cyclohexane, 2,2-di (tert-butyl peroxy)butane, or 2,2-di(4,4-di(tert-butyl peroxy) cyclohexyl)propane, etc. For example, the peroxy carbonate compound comprises tert-butyl peroxy isopropyl carbonate, tert-butyl peroxy allyl carbonate, di-ethylene glycol bis(tert-butyl peroxy carbonate), or di-hexalene glycol-bis(tert-butyl peroxy carbonate), etc. For example, the azo compound having the nitro group and the heterocyclic group comprises 1,1'-azo-bis-1-cyclohexane carbonitrile, or 1,1'-azo bis(cyanodimethyl cyclohexane), etc.

In one embodiment, the main chain modified conjugated diene based polymer is the main chain modified conjugated diene-vinyl aromatic hydrocarbon copolymer, and a modified quantity of which is 0.1~5 mol % of a 1,2-vinyl structure of the main chain modified conjugated diene-vinyl aromatic hydrocarbon copolymer. In other words, of the main chain modified conjugated diene-vinyl aromatic hydrocarbon copolymer, a mole ratio of a quantity of a functional group from the modifier to a quantity of the 1,2-vinyl structure is 0.1~5.

In one embodiment, based on the total amount of the conjugated diene monomer and the vinyl aromatic hydrocarbon monomer as 100 parts by weight, the quantity by weight of the stabilizer for the rubber resin per mole of the main chain modified conjugated diene-vinyl aromatic hydrocarbon copolymer is 0.2~2 by weight/mole, and in other words, the quantity of the stabilizer/the modified quantity of the main chain modified conjugated diene-vinyl aromatic hydrocarbon copolymer equals 0.2~2 weight parts/mole.

In one embodiment, in the rubber composition, a weight ratio of the main chain modified conjugated diene-vinyl aromatic hydrocarbon copolymer to the stabilizer is 100: 0.2~2.

The invention may be better understood by reference to the following embodiments.

<Un-Modified Conjugated Diene-Vinyl Aromatic Hydrocarbon Copolymer>

Firstly, 800 g of cyclohexane used as a solvent was added into a reaction tank, and a constant temperature of 45° C. was maintained. Next, 0.64 g of 2,2-di(2-tetrahydrofuryl) propane (DTHFP) used as the structure modifier was added into the reaction tank. Then, 0.08 g of n-butyllithium used as the initiator for the polymerization reaction was added into the reactor. In the meanwhile, a mole ration of the microstructure modifier to the initiator for the polymerization was about 2:1 substantially. Next, 44.7 g of styrene as the vinyl aromatic hydrocarbon monomer and 168.3 g of butadiene as the conjugated diene monomer were added into the reaction tank to carry out the polymerization reaction, and then 7.46 g of the butadiene monomer was added to play a part of the reaction. Meanwhile, the solution was sampled and the solvent was removed. The measurement results of the un-modified conjugated diene-vinyl aromatic hydrocarbon copolymer obtained by the infra-red (IR) or nuclear magnetic resonance (NMR) spectroscopy show that the vinyl (1,2) structure amounts to 62.5% of the all butadiene structure unit. Of the un-modified conjugated diene-vinyl aromatic hydrocarbon copolymer, the styrene structural unit amounts to about 21 wt. % of the whole of the butadiene structural unit and the styrene structural unit; and the butadiene structural unit amounts to 79 wt % of the whole of the butadiene structural unit and the styrene structural unit.

<Main Chain Modified Conjugated Diene-Vinyl Aromatic Hydrocarbon Copolymer and Rubber Composition>

After the reaction was stopped by adding methanol of higher mole than the initiator, 2-mercaptoethanol as the modifier was added, and the temperature was set to start increasing to 80° C., and then 1,1-Bis(t-butyl peroxy)3,3,5-trimethyl cyclohexane as the accelerator was added. After 3 hours, the main-chain-modifying reaction (addition modification reaction induced by the free radical accelerator) was stopped by an antioxidant (IX-1076) (Comparative examples 1~6) or the stabilizer of the quantity of Embodiments 7~12 shown in table 1. The use quantity of the antioxidant is about 1.2 times of the accelerator. After the reaction, a raw glue could be precipitated by using the alcohol (such as methanol, ethanol or isopropyl alcohol) or removing the solvent by water steam, after drying steps, the main chain modified conjugated diene-vinyl aromatic hydrocarbon copolymer would be obtained.

<Comparison and Analysis>

Manufacturing methods for Comparative examples 1~6 and Embodiments 7~12 are similar except use quantities of the modifier, the accelerator, and the stabilizer, as listed in table 1. In Comparative examples 1 and 2, what are manufactured are the un-modified conjugated diene-vinyl aromatic hydrocarbon copolymer, and no stabilizer is used. In Comparative examples 3 to 6, what are manufactured are the main chain modified conjugated diene-vinyl aromatic hydrocarbon copolymer, and no stabilizer is used. In Embodiments 7 to 12, the stabilizer and the main chain modified conjugated diene-vinyl aromatic hydrocarbon copolymer are mixed together to form the rubber composition.

In table 1, the use quantities of the modifier and the stabilizer are defined as a unit of phr based on the total weight of the styrene and the butadiene as 100 parts, i.e. parts per hundreds of rubber. For example, "0.3 phr of the modifier" refers to 0.5 weight parts of the modifier per 100 weight parts of the whole of the styrene and the butadiene, equal to 0.476 wt. %. A modified ratio (mole/mole vinyl, i.e. based on the mole of the vinyl group), presented by unit of %, is calculated from variations of peaks between positions of 3.7-3.9 ppm measured by the $^1$H NMR. The actual modified quantity represented by the unit of phr is calculated according to the modified ratio (%), the vinyl group content of 62.5%, the butadiene ratio of 79%. The unit for the stabilizer/the modifier is mole/mole.

TABLE 1

| | Comparative example | | | | | |
|---|---|---|---|---|---|---|
| | 1 | 2 | 3 | 4 | 5 | 6 |
| Accelerator (ppm) | 0 | 50 | 50 | 100 | 150 | 200 |
| Modifier (phr) | 0 | 0 | 0.5 | 0.5 | 0.5 | 0.5 |
| Stabilizer (phr) | 0 | 0 | 0 | 0 | 0 | 0 |
| Modified ratio (%) | 0 | 0 | 0.05 | 0.09 | 0.12 | 0.25 |
| Actual modified quantity (phr) | 0 | 0 | 0.04 | 0.06 | 0.09 | 0.18 |
| Stabilizer/Modifier | 0 | 0 | 0 | 0 | 0 | 0 |

| | Embodiment | | | | | |
|---|---|---|---|---|---|---|
| | 7 | 8 | 9 | 10 | 11 | 12 |
| Accelerator (ppm) | 150 | 150 | 150 | 200 | 200 | 200 |
| Modifier (phr) | 0.5 | 0.5 | 0.5 | 0.5 | 0.5 | 0.5 |
| Stabilizer (phr) | 0.1 | 0.15 | 0.2 | 0.13 | 0.18 | 0.23 |
| Modified ratio (%) | 0.11 | 0.12 | 0.11 | 0.25 | 0.24 | 0.25 |
| Actual modified quantity (phr) | 0.08 | 0.08 | 0.08 | 0.18 | 0.17 | 0.18 |
| Stabilizer/Modifier | 0.18 | 0.26 | 0.36 | 0.11 | 0.15 | 0.19 |

Table 2 shows Mooney viscosities in different storage times of Comparative examples 1~6 and Embodiments 7~12. The Mooney viscosity was measured by the MV-2000 equipment according to ASTM D-1646 method. The measuring temperature was 100° C. The measuring time was 1+4 minutes.

TABLE 2

| Storage time (hr) | Comparative example | | | | | |
|---|---|---|---|---|---|---|
| | 1 | 2 | 3 | 4 | 5 | 6 |
| | Mooney viscosity | | | | | |
| 24 | 44.3 | 45.2 | 44.5 | 45.3 | 43.5 | 44.8 |
| 48 | 45.1 | 45.5 | 44.6 | 45.1 | 43.9 | 44.6 |
| 72 | 44.8 | 45.8 | 44.4 | 45.6 | 44.1 | 45.0 |
| 96 | 45.3 | 45.9 | 44.8 | 45.9 | 44.0 | 45.2 |
| 120 | 44.2 | 46.1 | 45.0 | 45.8 | 44.5 | 45.8 |
| 144 | 45.7 | 46.3 | 45.1 | 46.1 | 44.9 | 46.2 |
| 168 | 44.3 | 46.5 | 45.8 | 46.3 | 45.2 | 46.8 |
| 192 | 45.8 | 46.8 | 45.2 | 46.8 | 46.0 | 47.0 |
| 216 | 44.7 | 47.1 | 45.0 | 46.6 | 46.5 | 47.6 |
| 240 | 45.1 | 47.3 | 45.5 | 46.8 | 48.0 | 48.3 |
| 264 | 44.9 | 47.5 | 45.9 | 47.0 | 48.5 | 49.5 |
| 288 | 44.2 | 47.8 | 46.5 | 47.2 | 49.0 | 50.5 |
| 312 | 45.3 | 48.0 | 46.7 | 47.5 | 50.6 | 51.6 |
| 336 | 44.8 | 48.2 | 47.0 | 47.9 | 51.2 | 53.8 |
| 360 | 45.4 | 48.4 | 47.4 | 48.6 | 53.0 | 57.2 |

TABLE 2-continued

| Storage time (hr) | Embodiment | | | | | |
|---|---|---|---|---|---|---|
| | 7 | 8 | 9 | 10 | 11 | 12 |
| | Mooney viscosity | | | | | |
| 24 | 44.2 | 44.5 | 45.2 | 45.2 | 45.0 | 44.1 |
| 48 | 44.4 | 44.9 | 44.9 | 45.0 | 45.4 | 44.4 |
| 72 | 44.7 | 45.2 | 45.6 | 45.6 | 45.6 | 44.5 |
| 96 | 44.5 | 45.1 | 45.1 | 45.5 | 45.8 | 44.2 |
| 120 | 44.9 | 45.4 | 44.7 | 46.1 | 46.1 | 44.0 |
| 144 | 45.3 | 45.8 | 44.5 | 46.3 | 46.6 | 44.6 |
| 168 | 45.6 | 46.0 | 45.3 | 46.8 | 46.8 | 44.3 |
| 192 | 46.1 | 46.2 | 45.1 | 47.1 | 47.1 | 44.5 |
| 216 | 46.5 | 46.4 | 44.9 | 47.6 | 47.4 | 44.2 |
| 240 | 47.2 | 46.8 | 45.4 | 48.5 | 47.6 | 44.1 |
| 264 | 47.8 | 47.3 | 45.1 | 49.1 | 48.1 | 44.5 |
| 288 | 48.3 | 47.6 | 44.7 | 49.8 | 48.7 | 44.6 |
| 312 | 48.9 | 47.9 | 44.9 | 50.5 | 49.2 | 44.2 |
| 336 | 49.5 | 48.2 | 45.2 | 51.1 | 49.8 | 44.3 |
| 360 | 50.8 | 48.7 | 45.0 | 51.9 | 50.1 | 44.1 |

From the results of tables 1, 2, after the storage time of 360 hours, compared to Comparative example 1, Comparative examples 2~6 having more accelerator and modifier have higher Mooney viscosities, which become more and more large with the increasing storage time. Comparative example 5 has higher Mooney viscosity than Embodiments 7~9 having the same quantity of the accelerator and the modifier with Comparative example 5. Comparative example 6 has higher Mooney viscosity than Embodiments 10~12 having the same quantity of the accelerator and the modifier with Comparative example 6. Those results indicate that in embodiments, mixing the stabilizer with the main chain modified conjugated diene-vinyl aromatic hydrocarbon copolymer can help stabilizing characteristic of the main chain modified conjugated diene-vinyl aromatic hydrocarbon copolymer. Embodiment 9 using the stabilizer of 0.2 phr has lower Mooney viscosity than Comparative example 1. Embodiment 12 using the stabilizer of more than 0.2 phr has lower Mooney viscosity than Comparative example 1.

While the invention has been described by way of example and in terms of the exemplary embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a rubber composition, comprising:
    a forming process for an un-modified conjugated diene based polymer;
    terminating the forming process for the un-modified conjugated diene based polymer;
    after the terminating the forming process for the un-modified conjugated diene based polymer, modifying the un-modified conjugated diene based polymer with a modifier in the presence of an accelerator to obtain a main chain modified conjugated diene based polymer; and
    mixing 100 parts by weight of the main chain modified conjugated diene based polymer and 0.2-2 parts by weight of a stabilizer, wherein the stabilizer has a structural formula of:

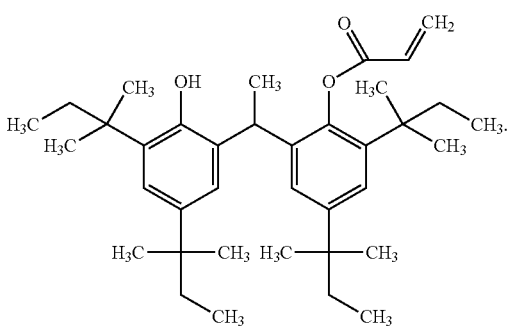 [SMILES: C=CC(=O)Oc1c(C(C)c2cc(C(C)(C)CC)cc(C(C)(C)CC)c2O)cc(C(C)(C)CC)cc1C(C)(C)CC]

2. The method for manufacturing the rubber composition according to claim 1, wherein a modified quantity of the main chain modified conjugated diene based polymer has 0.1-5 mol % of a 1,2-vinyl structure.

3. The method for manufacturing the rubber composition according to claim 1, wherein a conjugated diene based polymer of the main chain modified conjugated diene based polymer is selected from the group consisting of a conjugated diene-vinyl aromatic hydrocarbon copolymer rubber, a styrenic block copolymer, a conjugated diene-vinyl aromatic hydrocarbon block copolymer, a polybutadiene rubber having less than 40 mole % of a cis-structure, and a polybutadiene rubber having more than 90 mole % of a cis-structure.

4. The method for manufacturing the rubber composition according to claim 3, wherein the conjugated diene-vinyl aromatic hydrocarbon copolymer rubber is styrene-butadiene rubber (SBR), the styrenic block copolymer is styrene-butadiene block copolymer (SBC), the conjugated diene-vinyl aromatic hydrocarbon block copolymer is styrene-butadiene-styrene block copolymer (SBS), the polybutadiene rubber having less than 40 mole % of the cis-structure is low cis-polybutadiene rubber (LBR), the polybutadiene rubber having more than 90 mole % of the cis-structure is high cis-polybutadiene rubber (HBR).

5. The method for manufacturing the rubber composition according to claim 1, wherein the un-modified conjugated diene based polymer comprises an un-modified conjugated diene-vinyl aromatic hydrocarbon copolymer, the main chain modified conjugated diene based polymer comprises a main chain modified conjugated diene-vinyl aromatic hydrocarbon copolymer, the forming process for the un-modified conjugated diene based polymer comprises reacting a conjugated diene monomer with a vinyl aromatic hydrocarbon monomer in a solution to obtain the un-modified conjugated diene-vinyl aromatic hydrocarbon copolymer, wherein the un-modified conjugated diene-vinyl aromatic hydrocarbon copolymer is modified by the modifier to form the main chain modified conjugated diene-vinyl aromatic hydrocarbon copolymer.

6. The method for manufacturing the rubber composition according to claim 5, wherein a weight of the conjugated diene monomer: a weight of the vinyl aromatic hydrocarbon monomer is 2-5:1.

7. The method for manufacturing the rubber composition according to claim 5, a weight ratio of a total amount of the conjugated diene monomer and the vinyl aromatic hydrocarbon monomer to a quantity of the stabilizer is 100:0.2-2.

8. The method for manufacturing the rubber composition according to claim 5, wherein the modifier comprises a mercapto group containing modifier.

9. The method for manufacturing the rubber composition according to claim 8, wherein the modifier comprises a mercapto group containing alcohol compound, a mercapto group containing acid compound, or a mercapto group containing ester compound.

10. The method for manufacturing the rubber composition according to claim 5, wherein a mole ratio of the stabilizer to the modifier is 0.1-10.

* * * * *